Figure 1:
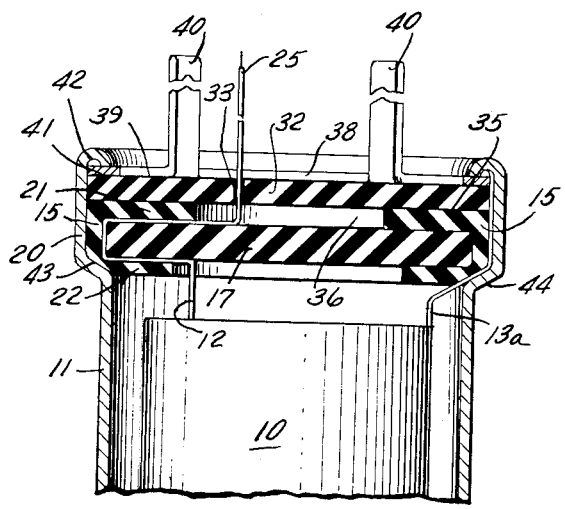

Sept. 18. 1956  J. B. BRENNAN  2,763,708
CLOSURE, TERMINAL AND MOUNTING CONSTRUCTIONS
FOR ELECTRICAL DEVICES
Filed July 11, 1950  4 Sheets-Sheet 1

Joseph B Brennan
INVENTOR.

Sept. 18, 1956            J. B. BRENNAN          2,763,708
CLOSURE, TERMINAL AND MOUNTING CONSTRUCTIONS
FOR ELECTRICAL DEVICES
Filed July 11, 1950

4 Sheets-Sheet 3

*Joseph B Brennan*
INVENTOR.

INVENTOR.

United States Patent Office 2,763,708
Patented Sept. 18, 1956

2,763,708

CLOSURE, TERMINAL AND MOUNTING CONSTRUCTIONS FOR ELECTRICAL DEVICES

Joseph B. Brennan, Cleveland, Ohio

Application July 11, 1950, Serial No. 173,044

17 Claims. (Cl. 174—52)

This invention relates to electrical devices, and more particularly to closure, terminal and mounting constructions for electrical devices. The invention is described herein in connection with electrolytic condensers and the like. It is to be understood, however, that the invention is useful in connection with various other electrical devices, such as for example, oil condensers. The present application is a continuation in part of my co-pending applications Serial No. 733,970, filed March 11, 1947, now Patent Number 2,665,329, and Serial No. 140,513, filed January 25, 1950, now Patent Number 2,671,126.

Electrolytic condensers ordinarily comprise a container within which the electrodes or plates of the condenser are disposed. The container serves to retain the electrolyte required for the operation of the condenser, and it also serves to protect the condenser plates. The electrolyte ordinarily is a liquid or a viscous paste. In order to prevent loss of the electrolyte, it is necessary that the container be sealed, and it is also necessary that one or more terminals or leads be extended from the electrodes within the container to a position on the exterior of the container.

A general object of the invention is to provide a closure and terminal support construction for electrolytic devices by means of which the container of the device can be effectively and permanently sealed against leakage of the electrolyte, in which leads or terminals can be extended from the interior to the exterior of the device and firmly supported and insulated from each other, and in which means for supporting the device can be incorporated if desired. Heretofore, the problem of providing closures and support for the leads or terminals of condensers has not been solved in satisfactory fashion because of the difficulty of providing effective closures and seals which can be manufactured and assembled at low cost. Accordingly, another object of my invention is the provision of a construction which can be manufactured at a substantial saving in cost as compared to the cost of prior types of closure assemblies.

According to my application Serial No. 733,970 aforesaid, I provide an effective seal and closure for the container for an electrolytic device and a support for the terminals thereof by disposing within the open end of the container two members composed of resilient material such as rubber (the term "rubber" as used herein includes both natural and synthetic rubber and rubberlike materials) and having opposed mating surfaces. One or more terminal members, preferably in the form of small wires or strips of thin metallic foil, extend from the exterior to the interior of the container between the opposed mating surfaces, and the resilient members are deformed to admit the terminal and to seal against the terminal and each other. In my application Serial No. 140,513, a similar seal was employed and, in conjunction with the seal, means were provided for mounting the condenser or other electronic device in an apparatus. According to the present invention, a further improvement has been devised wherein it is possible to eliminate certain parts contained in the constructions disclosed in the two above applications.

Figure 2:
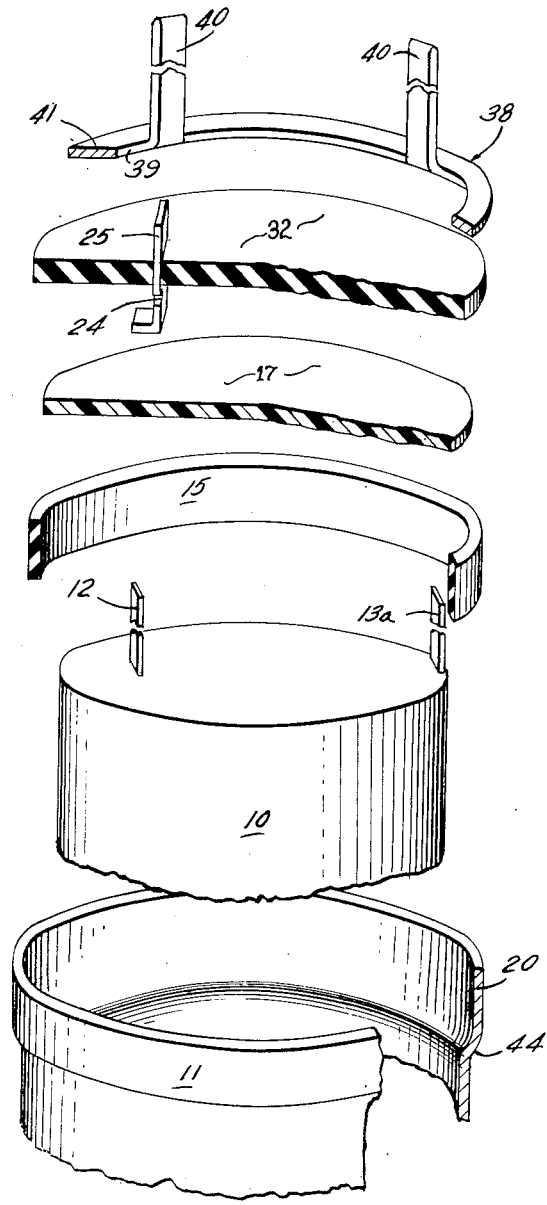
Figure 3:
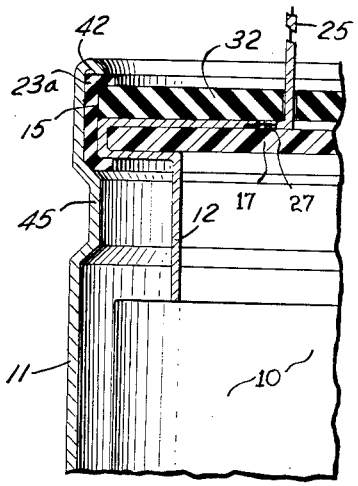
Figure 4:
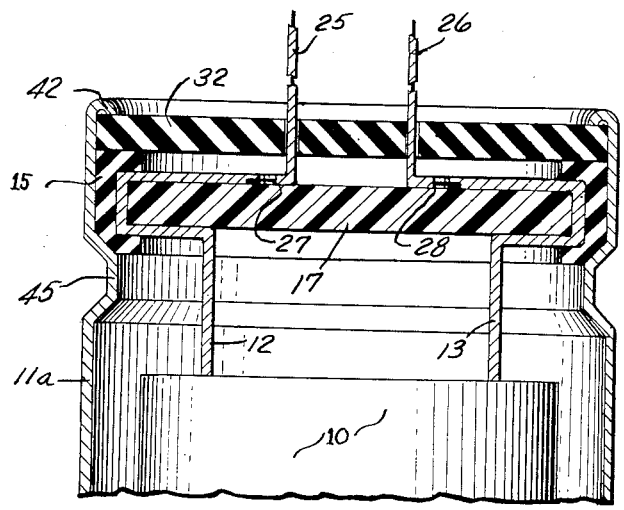
Figure 5:
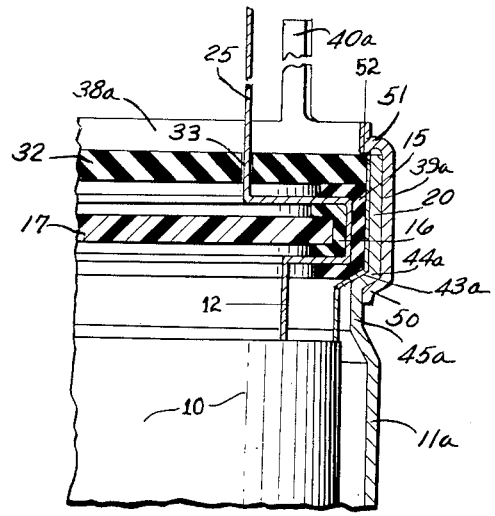
Figure 6:
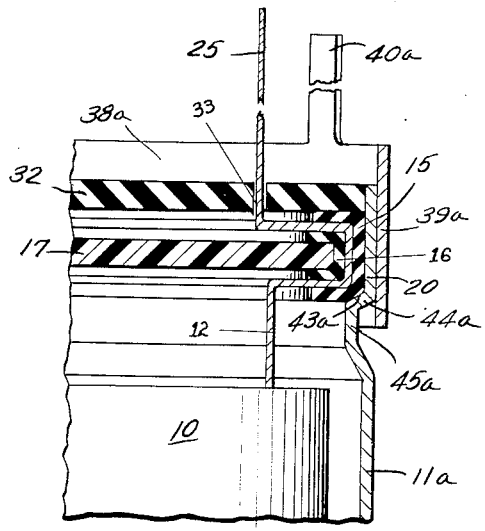

Further objects and advantages of the invention will become apparent from the following description of preferred forms thereof, reference being made to the accompanying drawings in which Figure 1 is a vertical sectional view of one form of closure and terminal support; Figure 2 is an exploded view illustrating the component parts of Figure 1; Figure 3 is a partial vertical view of another form of my invention; Figure 4 is also a vertical section of still another form of my invention; Figure 5 is a vertical sectional view of a condenser embodying a further modification of my invention; and Figure 6 is a vertical sectional view showing one stage in the assembly of the condenser illustrated in Figure 5.

Referring to Figure 1, a condenser embodying one form of my invention may comprise an electrode assembly 10 disposed within a container 11, the container being a thin-walled open-ended cup or can composed of aluminum or other suitable material. The electrode or plate assembly may be of any desired construction; this assembly per se forms no part of the present invention and will not be described further herein. A terminal or lead 12 projects upwardly from the assembly 10 to an external circuit. The terminal 12 may be composed of fine wire, narrow strips of thin (0.020 inch for example) aluminum foil or other suitable conductive material and extends between the resilient annular sealing means and the imperforate closure disk 17. A second terminal 13a may be embedded in the outer surface of the resilient annular sealing means 15 and may be in contact with the container 11 and the cathode mounting ring 38. The cathode terminal 13a also may be located on the inner surface of the annular sealing means 15 and may extend through the terminal supporting disk and thence form an electrical contact with the cathode ring 38. The annular sealing band 15 is supported by the imperforate closure disk 17, the closure disk 17 being composed of a plastic dielectric material such as a phenolic condensation product, hard rubber, or other material that will not contaminate or be damaged by the electrolyte. In a typical installation in a 10 mfd. condenser the imperforate closure member may have a thickness of about ⅛ to ¹⁄₁₆ inch. The sealing member 15 is held in sealing engagement with the container 11, with the terminal members 12 and 13a, with the closure member 17, and with the wall of the container 11 at the portion of the container indicated at 20. The sealing member 15 may be composed of any suitable resilient dielectric material which will not contaminate or be damaged by the electrolyte. Rubber strips, a latex layer, or rubber of the sort used in ordinary small rubber bands may be employed in the composition of the sealing band 15. Where the terminals are 0.020 inch thick, sealing members having a normal thickness of about ¹⁄₁₆ inch, for example, are satisfactory. The thickness of the sealing member is not critical so long as there is sufficient resilience to permit the terminals to be embedded in and sealed against the sealing member. Preferably, the sealing member 15 is stretched lightly (or a layer of rubber or other dielectric material may be applied) over the periphery of the closure disk 17. However, a layer of rubber or other dielectric material may be inserted in liquid form on the interior surface of the container 11 at the portion of the container indicated at 20.

The annular sealing member 15 may have inwardly extending flanges 21 and 22 that engage the marginal edge portions of the upper and lower surfaces of the imperforate closure member 17. The sealing member 15 is sealed against the portion 20 of the container 11, the closure member 17, and the terminals or leads 12 and 13a. The terminal 12 may be of a stiffness sufficient to permit the terminal 12 to be crimped around the edge of the imperforate closure member 17; or slots or grooves may be provided in the imperforate member 17 to provide a fitting for the terminal 12. The sealing may be effected, for example, by the spinning of the edge 42 of the portion 20 of the container 11. The material of the annular sealing ring 15 is soft and resilient enough to permit the terminal members to become embedded therein with the resilient ring 15 sealing not only against the lateral face of the terminals 12 and 13a but also against the narrow edges thereof when terminal fittings are not provided, thus effectively sealing the container against leakage.

In order to retain the external terminal member 25 in proper position and also to separate and insulate it from other terminals and the cathode mounting ring 38, a terminal supporting disk 32 is disposed immediately above the closure member 17. The terminal supporting member 32 may be relatively thin (for example, 1/16 inch) and may be composed of any suitable dielectric material such as hard fibre or the like. The terminal supporting member 32 does not come into contact with the electrolyte and therefore contamination of the electrolyte and damage to the terminal supporting member by the electrolyte are not problems.

The terminal supporting member 32 has an aperture 33 through which the shanks or wire extensions of external terminal member 25 extends. The outer marginal edges of the member 32 engages and compress the upper annular edge of the sealing ring 15 as indicated at 35, the external diameter of the terminal supporting member 32 approximating the internal diameter of the portion 20 of the container 11. The thickness of the annular sealing ring 15 where it is disposed between the members 17 and 32 is such that a thin space 36 may be left between the disks 17 and 32, which space accommodates the extension of terminal 12 and the extension or foot portion of terminal 25. The depth of the space, however, is preferably slightly less than the thickness of the terminal 12. Where the terminal 12 does not extend in a continuous wire and foot portions, as are shown in Figures 3 and 4, are provided to which the terminal 12 is welded or otherwise connected, the depth of the space 36 is slightly less than the combined thicknesses of the terminals 12 and 13 and the feet 27 and 28. Thus, the feet are held tightly between the members 17 and 32 which may deflect slightly to accommodate them; and, as is best illustrated in Figure 4, the terminals 25 and 26 are thereby retained in position against any substantial amount of movement.

In order to provide for mounting of condensers in apparatus such as radios and the like, it is customary to employ a cathode and/or mounting ring. Such a cathode and/or mounting ring can readily be assembled with condensers embodying the present invention. As is shown in Figure 1, such cathode and mounting ring 38 may have a short cylindrical portion 39 with mounting lugs 40 of the conventional type at its upper end and an external flange 41 at its lower end. The flange 41 is disposed immediately above and in contact with the upper marginal surface of the terminal supporting member 32 and the mounting ring and entire seal and terminal assembly is held in place by spinning or otherwise turning in the upper edge of the portion 20 of the container 11 as indicated at 42. The spinning operation subjects the cover assembly to axial compression, compressing the annular sealing ring 15 by the pressure exerted by the disk 32 in the zone 35 and the pressure exerted in the opposite direction in the zone 43 adjacent the shoulder 44. When the ring is to be used as a cathode terminal any convenient means may be employed to connect the condenser cathode thereto as, for example, spot-welding the cathode thereto.

Figure 2 is an exploded view showing the component parts of Figure 1 prior to assembly. The method of assembly will also become apparent from an examination of Figure 2. Initially, the container 11 is provided with a flared mouth, thus forming the shoulder 44, the portion 20 of the container 11 being straight from the shoulder 44 to the end of the container. The terminal member 12 may be welded and/or clinched to the terminal 25 at any convenient time during the assembly operation. Slots 24 may be made in the terminal member 25 to provide an additional or alternative means of binding or clinching the terminal member 12 to the terminal member 25. The terminal member 12 is disposed in contact with the outer edge surfaces of the imperforate closure member 17. The annular rubber ring 15 which is normally of smaller diameter than the imperforate closure disk 17 is stretched, for example, over the periphery of the closure disk 17 so as to overlie both the terminal 12 and the periphery of the closure disk 17. The cathode terminal member 13a is distorted outward previously so as to extend around the outer surface of the annular band 15.

After the resilient sealing ring 15 is stretched over the imperforate closure member 17 and the terminal member 12, the terminal 25 is then welded and/or clinched to terminal 12 unless the operation has previously been performed. Where, as is shown in Figure 1, the terminal 12 and the terminal 25 are formed from a continuous wire strip, the welding and clinching operation becomes unnecessary. Next, the electrode assembly 10 is located within the container 11. Then the closure disk 17, with the resilient sealing ring 15 stretched over the periphery thereof and with the terminal 12 extending between the outer surface of the ring 15 and the exterior edge surfaces of the closure member is pressed into the portion 20 of the container 11 until the inwardly extending marginal portion 22 of the resilient sealing band 15 is firmly in engagement with the shoulder 44 of the container 11 at the point 43. Thereafter, the terminal supporting member 32 is slipped over the terminal 25 and into the open end of the portion 20 of the container 11. The mounting and cathode ring 38 is placed in position and the end edge of portion 20 of the container 11 is turned over as at 42 by a spinning or pressing operation to firmly engage the flange 41 of the cathode mounting ring 38 and exert pressure thereon so as to compress the seal assembly between the terminal supporting disk 32 and the shoulder 43, thus completing the assembly.

Another advantageous method of assembly would consist of the essential features of the method heretofore specifically described. However, prior to the positioning of the resilient sealing band 15 over the imperforate closure member 17, the terminal supporting member 32 is first slipped over the terminal 25. The imperforate closure member 17, if it has not previously been included in the assembly, may then be inserted in its proper position. The resilient sealing band 15 is now stretched over the periphery of the closure disk 17 in the manner heretofore described. This latter method is particularly adaptable to the assembly of the construction disclosed in Figure 3 where the resilient band 15 extends beyond and over the edge of the terminal supporting member 32.

Figure 3 illustrates another manner in which the invention described herein may be practiced. As was shown particularly in Figure 1, the resilient annular sealing ring 15 extended around the edge poriton and partially over the upper and lower surfaces of the imperforate inner disk 17. The terminal 12 for the condenser assembly 10 is in the form of wire, for example, and extended between the sealing member 15 and the imperforate inner disk 17 and thence through the openings in the terminal supporting member 32; and, as was shown in Figure 1, the cathode terminal 13a extends around the exterior edge or surface of the sealing member 15 and the inner surface of the container 11 to form a contact with the container 11 and the cathode ring 32. However, as is shown in Figure 3, the resilient annular sealing ring 15 may extend from a position below the lower surface of the imperforate closure member 17 to a position above and over the terminal supporting disk 32. The external terminal 25 and the terminal 12 may consist of a continuous wire or foil strip as was shown in Figure 1, or it may consist of wire or foil terminals 12 and 13 welded and/or clinched to conductor wire or tinned steel external terminal members 25 and 26 respectively in the manner illustrated in Figures 3 and 4 where the foot portions 27 and 28 of the external terminal members 25 and 26 are welded to the ends of terminals 12 and 13.

The terminal 12, as is shown in Figure 3, extends from a position within the container 11 between the inner surface of the resilient annular sealing ring 15 and around the lower surface and the edge portion of the imperforate closure member 17, and then between the upper surface of the imperforate closure member 17 and the lower surface of the terminal supporting member 32 and thence through the opening in the upper disk 32. A cathode terminal, not shown, may extend around the outer surface of the annular sealing band 15 and the inner surface of the container 11 to form a contact with the container and a cathode ring in a manner similar to that shown in Figure 1. A terminal member may also extend between the inner surface of the annular sealing band 15 and around the lower surface and the edge portion of the imperforate closure disk 17, between the upper surface of the imperforate closure member 17 and the terminal supporting disk 32, and thence through an opening in the terminal supporting member 32, so as to form a second exterior anode connection, this latter type of terminal construction being best illustrated in Figure 4.

Referring to Figure 4, the resilient annular sealing ring 15 extends around the edge portion and over the upper and lower surfaces of the imperforate inner disk 17. The terminals for the condenser assembly 10 are in the form of a wire welded or otherwise fastened to the terminals 25 and 26 at the foot portions 27 and 28. The terminals in this instance extend between the sealing member 15 and the exterior edge surfaces of the imperforate closure member 17, between the lower surface of the member 32 and the upper surface of the member 17, and thence through the openings 33 and 34 in the terminal supporting disk 32. The remaining parts of the structure function and are arranged in the manner previously described with reference to Figures 1, 2, and 3, and the reference characters employed in Figures 1, 2, and 3 have been applied to corresponding parts in Figure 4.

Figures 5 and 6 illustrate an adaptation of the invention to a container and mounting ring construction of a different type. In these figures, the sealing member 15 and the disks 17 and 32 function in the manner previously described and these and other identical parts are identified by the reference characters used in describing the various modifications of my invention. However, in this form of the invention, the container 11a is composed of water-proofed cardboard, plastic, thin metal or other material which does not of itself have great strength, and the mounting ring 38a is utilized to reinforce the container to provide the necessary strength for creating an effective seal by compression of the resilient sealing ring 15. In this modification, the container 11a is initially provided with an inwardly extending groove 45a furnishing a shoulder 44a to act as a stop for the seal assembly. The upper portion 20a of the container is initially straight. The mounting ring 38a is preferably composed of aluminum, steel or other suitable material and comprises mounting lugs 40a and a straight tubular portion or sleeve 39a having sufficient strength to exert the necessary clamping force on the resilient sealing band 15. In the construction of the present modification of my invention, the cathode terminal member 13a functions in much the same manner as was described in reference to Figure 1. The cathode terminal member 13a in this instance extends around the exterior surface of the resilient sealing band 15 and forms a physical and electrical contact with the cathode mounting ring 38a and the supporting sleeve 39a, or, as was described with reference to Figure 1, the cathode member 13a may extend between the annular sealing member 15 and the closure member 17 and thence through the terminal supporting disk 32 to form an electrical contact with the cathode ring 38a. Where the portion 20a of the container 11a is composed of a conductive material, electrical contact would also be made with the container by the cathode terminal member 13a.

To assemble condensers embodying this construction, the parts are first disposed as shown in Figure 6, the disks 17 and 32 and the sealing member 15 being pressed into the portion 20a of the container 11a after the mounting sleeve 39a has been positioned around the portion 20a to reinforce it. Then the sleeve 39a is spun or otherwise deformed inwardly immediately below the shoulder 44a as indicated at 50 in Figure 5 to support and reinforce the shoulder. The assembly is completed by spinning or otherwise forming the groove 51 immediately above the disk 32, thus providing an inwardly extending shoulder 52 above the terminal supporting disk 32. In practice, both grooves may be formed simultaneously. The spinning operation applies axial pressure to the seal assembly, pressure being exerted by the shoulder 52 to compress the disk 32 against the portion 35 of the resilient sealing member 15 and to compress the sealing member 15 against the shoulder 44a and against the cathode terminal member 13a at the point 43a, the shoulder 44a being supported by the inwardly deformed portion 50 of the sleeve 49a. Thus, the operation of deforming the sleeve secures the sleeve firmly to the container 11a, reinforces the container where such reinforcement is required in order to create sealing pressure, and compresses the resilient sealing means to make the seal.

From the foregoing description of preferred forms of my invention, it will be evident that I have provided a closure and terminal construction for electrolytic condensers and other electrolytic devices in which the containers for the device are properly sealed against loss of electrolyte and the terminals are supported in desired positions and separated and insulated from each other. My invention lends itself to use with conventional terminals and conventional mounting means for the condensers. The construction is such that the condensers can be manufactured and assembled at low cost, and by simple manufacturing operations the completed assembly is made leakproof and sturdy.

Those skilled in the art will appreciate that various changes and modifications can be made in the preferred forms of the invention described herein without departing from the spirit and scope of the invention. Therefore, it is to be understood that the foregoing description of preferred forms of the invention is given by way of example and that the scope of the invention is defined by the appended claims.

I claim:

1. In a closure and terminal support for an eelctrolytic device, an open-ended tubuar container; a rigid imperforate dielectric disc; a resilient dielectric annular sealing band placed and secured by and between the peripheral edge of said disc and the interior surface of said container; a terminal member extending, located and held in liquid and pressure sealed relationship between the exterior peripheral edge surface of said disc and the innermost surface of said annular sealing band; and pressurized means adapted both to retain the closure assembly in position within the open end of said container and to compress said resilient annular sealing band thereby to effect a fluid impervious seal.

2. In a closure and terminal support for an electrolytic device, an open-ended tubular container; a rigid imperforate dielectric disc disposed within the open end of said container; a resilient dielectric annular sealing band arranged around the peripheral edge of said disc and secured by and between the peripheral edge of said disc and the interior surface of said container; a plurality of terminal members circumferentially spaced around the outer peripheral edge of said disc, said terminals extending, located and held in liquid and pressure sealing relationship from the interior to the exterior of said container and between the innermost surface of said annular sealing band and the exterior peripheral edge surface of said imperforate disc; and pressurized means adapted both to retain the disc assembly in position within the open end of said container and to compress the resilient annular sealing band thereby to effect a fluid impervious seal.

3. In a closure and terminal support for an electrolytic device, an open-ended container; a rigid imperforate dielectric disc; a resilient dielectric annular sealing band placed and secured by and between the peripheral edge of said disc and the interior surface of said container; a terminal member extending, located and held in liquid and pressure sealed relationship between the exterior peripheral edge surface of said disc and the innermost surface of said annular sealing band; and pressurized means adapted both to retain the disc assembly in position within the open end of said container and to compress said resilient annular sealing band thereby to effect a fluid impervious seal, said container having an inwardly extending shoulder supporting said imperforate dielectric disc and said annular resilient member against inward movement in an axial direction, and the edge of the open end of said container being deformed inwardly so as to compress said annular sealing band against the edge of said imperforate disc and against the inner surface of said container immediately adjacent and above said inwardly extending shoulder.

4. In a closure and terminal support for an electrolytic device, an open-ended container; a rigid imperforate dielectric disc disposed within the open end of said container; a resilient dielectric annular sealing band arranged around the edge of said imperforate disc and secured by and between the edge of said disc and the interior surface of said container; a plurality of terminal members circumferentially spaced around the outer peripheral edge of said imperforate disc, said terminals extending in liquid and pressure sealing relationship from the interior to the exterior of said container and between the innermost surface of said annular sealing band and the exterior peripheral edge surface of said imperforate disc; and pressurized means adapted both to retain the disc assembly in position within the open end of said container and to compress said resilient annular sealing band thereby to effect a fluid impervious seal, said container having an inwardly extending shoulder supporting said imperforate dielectric disc and said annular resilient sealing member against inward movement in an axial direction, and the edge of the open end of said container being deformed inwardly so as to compress said annular sealing band against the edge of said imperforate disc and against the inner surface of said container immediately adjacent and above said inwardly extending shoulder.

5. In a closure and terminal support for an electrical device, an open-ended container; a perforated dielectric terminal supporting and separating disk disposed within the open end thereof, a rigid imperforate dielectric closure disc beneath the perforated disc; a resilient dielectric annular sealing band arranged around the peripheral edge of said imperforate closure disc and secured by and between the peripheral edge of said closure disc and the interior surface of said container; terminal members circumferentially spaced around the outer edges of said imperforate closure disc, said terminals extending and held in liquid and pressure sealing relationship from the interior to the exterior of said container between the innermost surface of said annular sealing band and the exterior peripheral edge surface of said imperforate closure disc and through said perforated terminal supporting and separating disk to the exterior of said container; and pressurized means adapted both to retain the discs in position within the open end of said container and to compress said resilient annular sealing band thereby to effect a fluid impervious seal.

6. In a closure and terminal support for an electrical device, an open-ended container; a rigid imperforate dielectric closure member; a resilient dielectric annular sealing band placed and secured by and between the annular edge of said closure member and the interior surface of said container, said annular dielectric sealing member having inwardly extending flanges which extend over the edge and partially over the inner and exterior surfaces of said imperforate closure member; a terminal member located and held in liquid and pressure sealed relationship between the exterior surface of said imperforate closure member and the innermost surface of said annular sealing member; and pressurized means adapted both to retain the closure assembly in position within the open end of said container and to compress said resilient annular sealing band thereby to effect a fluid impervious seal.

7. In a closure and terminal support for an electrical device, an open-ended container; a rigid imperforate dielectric closure member; a resilient dielectric annular sealing band placed and secured by and between the annular edge of said imperforate closure member and the interior surface of said container, said annular dielectric sealing member having inwardly extending flanges which extend over the edge and partially over the inner and exterior surfaces of said imperforate closure member; a terminal member located and held in liquid and pressure sealed relationship between the exterior surface of said imperforate closure member and the innermost surface of said annular sealing band; and pressurized means adapted both to retain the closure assembly in position within the open end of the container and to compress said resilient annular sealing band thereby to effect a fluid impervious seal, wherein an inwardly extending shoulder supports said imperforate dielectric closure member and said annular resilient sealing member against inward movement in an axial direction, and wherein the edge of the open end of said container is deformed inwardly so as to compress said annular sealing band against the edge of said imperforate closure member and against the inner surface of said container immediately adjacent and above said inwardly extending shoulder.

8. In a closure and terminal support for an electrolytic device, an open-ended container; a perforated dielectric terminal supporting and separating disk disposed within the open end thereof and overlying a rigid imperforate dielectric closure member; a resilient dielectric annular sealing band placed and secured by and between the annular edge of said imperforate closure member and the interior surface of said container, said resilient dielectric annular sealing member having inwardly extending flanges which extend over the edge and partially over the inner and exterior surfaces of said imperforate closure member; a terminal member located and held in liquid and pressure sealed relationship between the exterior edge surface of said imperforate closure member and the innermost surface of said resilient annular sealing band, said terminal further extending from the interior of the container through the perforated terminal supporting and separating disk to the exterior of said container; and pressurized means adapted both to retain the closure assembly in position within the open end of said container and to compress the said resilient annular sealing band thereby to effect a fluid impervious seal.

9. In a closure and terminal support for an electrolytic device, an open-ended container; a perforated dielectric terminal supporting and separating disk disposed within the open end thereof and overlying a rigid imperforate dielectric closure member; a resilient dielectric annular sealing band placed and secured by and between the annular edges of said imperforate closure member and said perforated terminal supporting and separating disk and the interior surface of said container, said resilient dielectric annular sealing member having inwardly extending flanges which extend over the edge and partially over the interior surface of said imperforate closure member and over the edge and partially over the exterior surface of said perforated terminal supporting and separating disk; a terminal member located and held in liquid and pressure sealed relationship between the innermost surface of said annular sealing band, the exterior surface of said imperforate closure member, and the interior surface of said perforated terminal supporting and separating disk, said terminal further extending from the interior of said container through the perforated terminal supporting and separating disk to the exterior of said container; and pressurized means adapted both to retain the closure assembly in position within the open end of said container and to compress said resilient annular sealing band thereby to effect a fluid impervious seal.

10. In a closure and terminal support for an electrolytic device, an open-ended container; a perforated dielectric terminal supporting and separating disk disposed within the open end thereof and overlying a rigid imperforate dielectric closure member; a resilient dielectric annular sealing band placed and secured by and between the annular edges of said imperforate closure member and said perforated terminal supporting and separating disk and the interior surface of said container, said resilient dielectric annular sealing member having inwardly extending flanges which extend over the edge and partially over the interior surface of said imperforate closure member and over the edge and partially over the exterior surface of said perforated terminal supporting and separating disk; a terminal member located and held in liquid and pressure sealed relationship between the innermost surface of said annular sealing band, the exterior surface of said imperforate closure member, and the interior surface of said perforated terminal supporting and separating disk, said terminal further extending from the interior of said container through said perforated terminal supporting and separating disk to the exterior of said container; and pressurized means adapted both to retain the closure assembly in position within the open end of said container and to compress said resilient annular sealing band thereby to effect a fluid impervious seal, wherein an inwardly extending shoulder supports said imperforate dielectric closure member and said annular resilient sealing member against inward movement in an axial direction, and wherein the edge of the open end of said container is deformed inwardly so as to compress said annular sealing band against the edge of said imperforate closure member and against the inner surface of said container immediately adjacent and above said inwardly extending shoulder.

11. In closure and terminal support for an electrolytic device, an open-ended container; a rigid imperforate dielectric closure member; a resilient dielectric annular sealing band placed and secured by and between the annular edge of said closure member and the interior surface of said container; an anode terminal member located and held in liquid and pressure sealed relationship between the exterior edge surfaces of said closure member and the innermost surfaces of said annular sealing band; a cathode terminal member located and held in liquid and pressure sealed relationship between the outermost surface of said annular sealing band and the interior surface of said container; a mounting ring positioned adjacent the open end of said container and exterior of said container, said cathode terminal member being in physical and electrical contact with said mounting ring, said mounting ring being inwardly deformed so as to exert a pressure adapted both to retain the closure assembly in position within the open end of said container and to compress said resilient annular band thereby to effect a fluid impervious seal.

12. In a closure and terminal support for an electrolytic device, an open-ended container; a rigid imperforate dielectric closure member disposed within the open end of said container; a resilient dielectric annular sealing band arranged around the edge of said closure member and secured by and between the annular edge of said closure member and the interior surface of said container; a plurality of anode terminal members circumferentially spaced around the outer edges of said imperforate closure member, said anode terminal members extending in liquid and pressure sealed relationship from the interior to the exterior of said container and between the innermost surface of said annular sealing band and the exterior edge surface of said imperforate closure member; a plurality of cathode terminal members located and held in liquid and pressure sealed relationship between the outermost surface of said annular sealing band and the interior surface of said container; a mounting ring and sleeve positioned adjacent the open end of said container and exterior of said container, said cathode terminals being in physical and electrical contact with said mounting ring and sleeve, said mounting ring and sleeve being inwardly deformed so as to exert a pressure adapted both to retain the closure assembly in position within the open end of said container and to compress said resilient annular band thereby to effect a fluid impervious seal.

13. In a closure and terminal support for an electrolytic device, an open-ended container; a rigid imperforate dielectric closure member; a resilient dielectric annular sealing band placed and secured by and between the annular edge of said closure member and the interior surface of said container, said annular dielectric sealing band having inwardly extending flanges which extend over the edge and partially over the inner and exterior surfaces of said imperforate closure member; an anode terminal member located and held in liquid and pressure sealed relationship between the exterior surface of said imperforate closure member and the innermost surface of said annular sealing band; a cathode terminal member located and held in liquid and pressure sealed relationship between the outermost surface of said annular sealing band and the interior surface of said container; a mounting ring positioned adjacent the open end of said container and exterior of said container, said cathode terminal member being in physical and electrical contact with said mounting ring, said mounting ring being inwardly deformed so as to exert a pressure adapted both to retain the closure assembly in position within the open end of said container and to compress said resilient annular band thereby to effect a fluid impervious seal.

14. In a closure and terminal support for an electrolytic device, an open-ended container; a perforated dielectric terminal supporting and separating disk disposed within the open end thereof and overlying a rigid imperforate dielectric closure member; a resilient dielectric annular sealing band placed and secured by and between the annular edges of said imperforate closure member and said perforated terminal supporting and separating disk and the interior surface of said container, said resilient dielectric annular sealing member having inwardly extending flanges which extend over the edge and partially over the interior surface of said imperforate closure member; an anode terminal member located and held in liquid and pressure sealed relationship between the innermost surface of said annular sealing band, the exterior surface of said imperforate closure member, and the interior surface of said perforated terminal supporting and separating disk, said anode terminal member further extending from the interior of said container through the perforated terminal supporting and separating disk to the exterior of said container; a plurality of cathode terminal members located and held in liquid and pressure sealed relationship between the outermost surface of said annular sealing band and the interior surface of said container; a mounting ring and sleeve positioned adjacent the open end of said container and exterior of said container, said cathode terminal members being in physical and electrical contact with said mounting ring and sleeve, said mounting ring and sleeve being inwardly deformed so as to exert a pressure adapted both to retain the closure assembly in position within the open end of said container and to compress said resilient annular band thereby to effect a fluid impervious seal.

15. The device as defined in claim 6, wherein the pressurized means comprise a mounting ring and sleeve positioned adjacent the open end and exterior to said container, said ring and sleeve being inwardly deformed to as to exert a pressure adapted both to retain the closure assembly in position within the open end of said container and to compress the resilient annular band to effect a fluid impervious seal.

16. The device as defined in claim 15, wherein the container is provided with an inwardly extending groove furnishing a shoulder to act as a stop for the seal assembly; said sleeve being deformed inwardly below said shoulder to reinforce said shoulder.

17. The device as defined in claim 16, wherein the mounting ring is metal and is provided with lugs; said terminal member being in electrical contact with said metallic mounting ring.

References Cited in the file of this patent

UNITED STATES PATENTS

| | | |
|---|---|---|
| 2,060,866 | Hetenyi | Nov. 17, 1936 |
| 2,183,092 | De Lange et al. | Dec. 12, 1939 |
| 2,202,166 | Peck | May 28, 1940 |
| 2,213,209 | De Lange et al. | Sept. 3, 1940 |
| 2,421,444 | Tyne | June 3, 1947 |
| 2,445,587 | Sims | July 20, 1948 |